(12) United States Patent
Anscher

(10) Patent No.: US 6,725,506 B1
(45) Date of Patent: Apr. 27, 2004

(54) STANDARDIZED CAP AND TAG KEEPER

(76) Inventor: Joseph Anscher, 1928 Midlane Rd., Muttontown, NY (US) 11791

( * ) Notice: Subject to any disclaimer, the term of this patent is extended or adjusted under 35 U.S.C. 154(b) by 0 days.

(21) Appl. No.: 09/576,357

(22) Filed: May 22, 2000

(51) Int. Cl.[7] .............................................. A44B 21/00
(52) U.S. Cl. .............................. 24/3.4; 24/3.1; 24/170; 24/599.1; 24/599.5
(58) Field of Search .................... 24/3.1, 3.4, 3.13, 24/13, 265 AL, 170, 265 BC, 599.1, 265 EC, 599.5, 265 H, 590, 618, 625; 224/258, 600, 607, 614–617, 646, 647; D3/318

(56) References Cited

U.S. PATENT DOCUMENTS

| | | | | |
|---|---|---|---|---|
| 2,947,456 A | * | 8/1960 | Seron ........................ | 224/258 |
| 3,551,963 A | * | 1/1971 | Mosher, Jr. et al. .......... | 24/618 |
| 4,304,403 A | * | 12/1981 | Wilson ...................... | 473/502 |
| 4,868,954 A | * | 9/1989 | Kasai ....................... | 24/265 H |
| 5,127,137 A | * | 7/1992 | Krauss ...................... | 24/265 H X |
| 5,842,256 A | * | 12/1998 | Anscher ..................... | 24/3.4 |
| 6,161,266 A | * | 12/2000 | Anscher ..................... | 24/625 |

FOREIGN PATENT DOCUMENTS

EP          0 567 011          3/1996

* cited by examiner

Primary Examiner—Robert J. Sandy
Assistant Examiner—Ruth C. Rodriguez
(74) Attorney, Agent, or Firm—Kenyon & Kenyon

(57) ABSTRACT

A standardized attachment system for an object holding system or object displaying system which is easily assembled, comprising a base section made of one or more pieces that engages a cord and an attachment section that secures the object to be held or displayed, such as an identification badge, key ring, and so forth. The standardized attachment system has a structure for coupling attachment sections and base sections that rotatably couples the attachment sections to the base sections and accommodates different configurations for base sections and attachment sections, as well as different cords and objects for display. Since different configurations of base sections and attachment sections can be used with the same coupling structure, an attachment system can be provided which is both flexible for use in various situations and easy to assemble. The attachment system may be made from an elastically deformable material such as molded plastic in a lightweight, cost-effective and aesthetically pleasing manner.

36 Claims, 10 Drawing Sheets

STANDARDIZED CAP AND TAG KEEPER

FIELD OF THE INVENTION

The present invention is directed to attachment systems for the holding and/or display of objects. More specifically, the present invention provides an easily assembled standardized attachment system for use in, for example, the holding and display of various objects, such as caps, identification tags, and similar objects.

BACKGROUND INFORMATION

Systems are known for the holding and display of objects such as hats, badges, whistles, keys, and so forth. These systems generally comprise a cord or similar wire-type material that may be worn by a person, for example, around the neck or around the wrist. Attached to the cord is an attachment piece, such as an alligator clip or a hook, for holding various objects. For example, in the case of an alligator clip, a badge or other object to be displayed can be secured by the alligator clip. Also, in the case of a hook, a whistle or keys can be attached to the hook.

These holding/display systems are inflexible, limited to a single type of attachment piece per system. Thus, a manufacturer that would like to provide display systems for badges and also provide hat keepers or attach different types of cords or wire-type materials to the system would need to manufacture entirely separate systems for each purpose. The manufacturer will thus be unable to flexibly respond to demand for any specific type of display/holding system.

One solution to this problem is presented in U.S. Pat. No. 5,842,256 issued to Anscher ("Anscher '256 patent"), expressly incorporated herein by reference. In the attachment system described in the Anscher '256 patent, different attachment sections (such as a clip hook or gripper) can be used with a single base and cord combination. In this system, the base section is composed of two pieces which, when interlocked with each other, allow the cord to be secured at one end of the base section and mate the base section to the attachment section at the other end.

However, the process for assembling this system is complex for the manufacturer. The cord cannot be secured at one end of the base section between the top piece and bottom piece before or after the attachment section is mated to the base section at the other end, because interlocking the top piece and the bottom piece secures the cord and mates the attachment section to the base section at the same time. Therefore, in order to create a usable product, all of the components in the attachment system (top piece of base section, bottom piece of base section, attachment section, and cord) must be assembled at the same time. A retailer or consumer could not purchase a set quantity of assembled base sections separately from a set quantity of different types of attachment sections and cords and connect up the sections of the system to each other and to the cords after each section of the system has been fully assembled.

SUMMARY OF THE INVENTION

The present invention provides an easily assembled standardized attachment system with a structure for coupling attachment sections and base sections that accommodates different base sections and different attachment sections, as well as different cords and objects for display. The base section can be made of one or more pieces. The attachment section (for example, a snap hook or clip hook) for holding and displaying objects such as hats, badges, whistles or keys is coupled to the base section. A cord (for securing the attachment system to a holder or person) can be separately coupled to the base section before or after the attachment section is coupled to the base section. Since different base sections and different attachment sections can be used with the same coupling structure, an attachment system can be provided which is both flexible for use in various situations and easy to assemble.

In an exemplary embodiment, the attachment system of the present invention comprises a base section rotatably coupled to an attachment section. The base section may be constructed of two pieces that interlock, allowing the cord to be secured to the base section once the two pieces have been secured together. The base section may also have a tab on the top piece, allowing the attachment section to be secured to the base section before or after the two pieces have been secured together. Exemplary means for securing the attachment section to the base section may involve snapping a post on the attachment section into the tab on the base section which has a predefined opening on the base section. The post may be a swivel post with an enlarged cap permitting the tab on the base section to engage the lower edge of the enlarged cap. This configuration gives the added benefit of rotational freedom for the object being held and displayed. The enlarged cap may have a spherical or conical shape. This configuration gives the added benefit of facilitating the snapping of the post into the tab. Exemplary means for coupling the cord to the base section are also provided, including, for example, a crimping arm, multiple forked members, and multi-toothed member.

The base section may be formed out of any suitable material which is elastically deformable to permit the tab to secure the attachment section to the base section once the post is snapped into the tab. Molded plastic is preferable for both the base section and the attachment section as being lightweight and aesthetically pleasing.

In an alternative embodiment, the base section may be comprised of only one piece and may have a similar shape to the shape of the attachment section (having a clip hook, a snap hook, or a gripper element), except that such a base section would have a female portion, such as a predefined opening, which, when mated with a male portion, such as a post, on the attachment section, would secure the attachment section to the base section. The male part on the attachment section may still be snapped into the female part on the base section. However, in this embodiment, the base section and attachment section can be interchangeably used: one section for securing the cord to the attachment system, and the other section for securing the object to be held and displayed (such as hats, badges, whistles or keys) to the attachment system. This configuration gives the added benefit of providing a more simplified mode of manufacture and assembly. The manufacturer could, in essence, manufacture the attachment systems by fabricating clip hooks, snap hooks or gripper elements, giving some of them male portions, such as posts (making them attachment sections), and giving the remainder female portions, such as predefined openings (making them base sections). The assembly would only require snapping an attachment section into a base section, and then securing the cord and object to each section. This configuration also presents an even greater flexibility for the consumer, since the consumer can interchangeably use different hooks or gripper elements for each section in the attachment system depending on their specific needs for the type of object to be held and displayed and the type of cord to be used to secure the object to a holder or person.

DETAILED DESCRIPTION OF THE INVENTION

Figure 1:
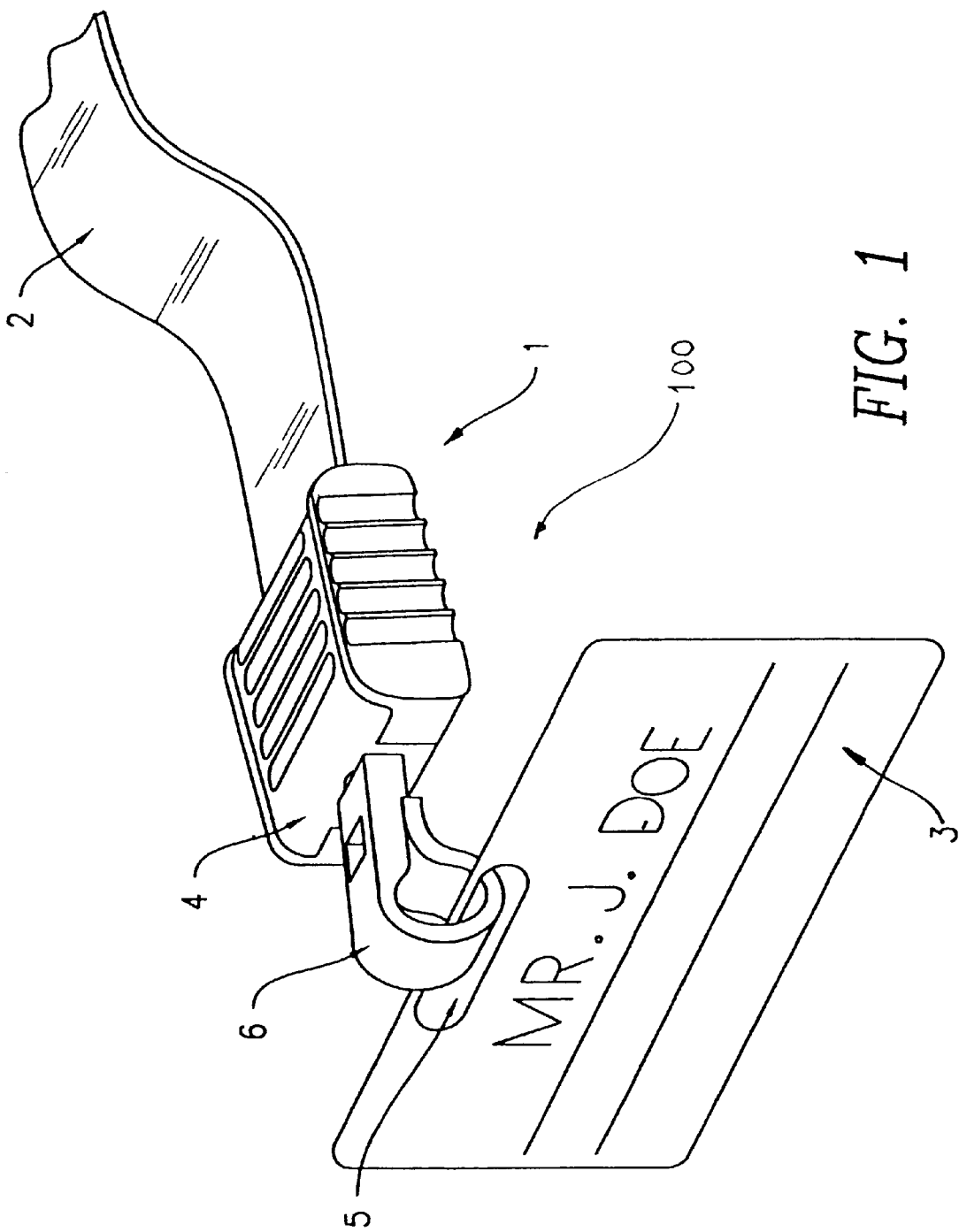
FIG. 1 shows a perspective view of an exemplary embodiment of an attachment system according to the present invention.

The attachment system according to the present invention can be illustrated by FIGS. 1–13, which depict an exemplary embodiment of the present invention. An attachment system 1 is connected to a cord 2 as part of an object holding system 100, and is holding and displaying an object 3. Attachment system 1 includes base section 4 and attachment section 6.

Figure 2:
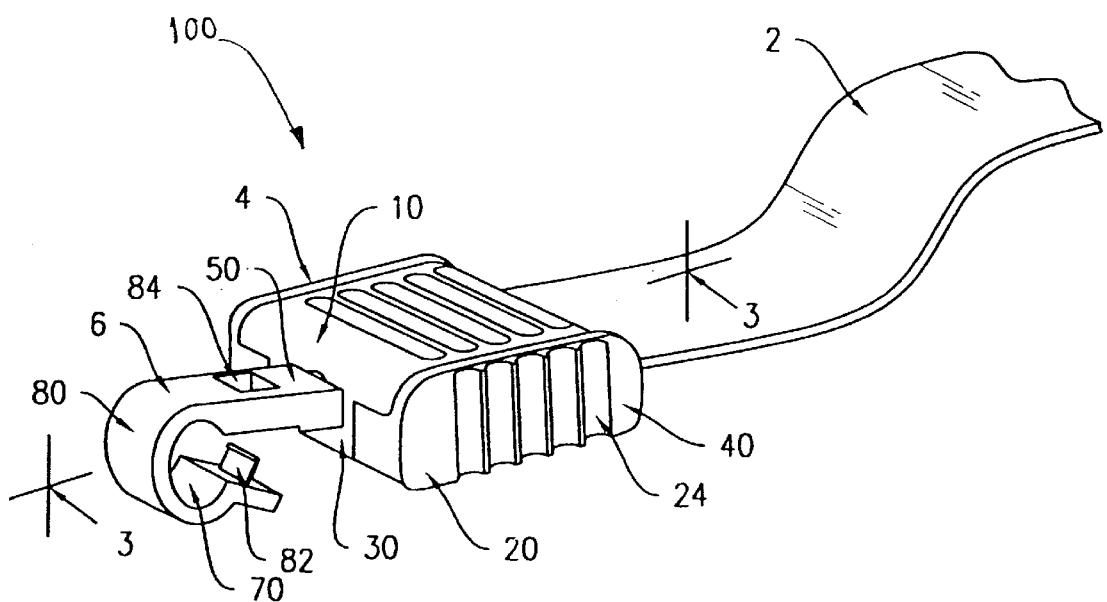
FIG. 2 shows a perspective view of an exemplary embodiment of an attachment system according to the present invention.
Figure 3:
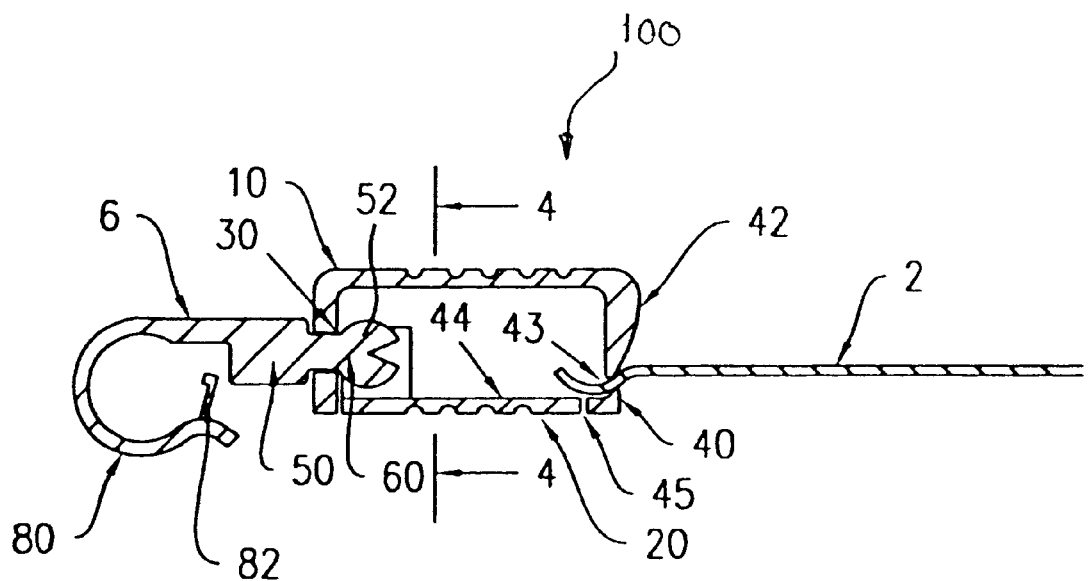
FIG. 3 shows a cross-sectional view of the attachment system according to the present invention along the line 3—3 of FIG. 2.
Figure 4:
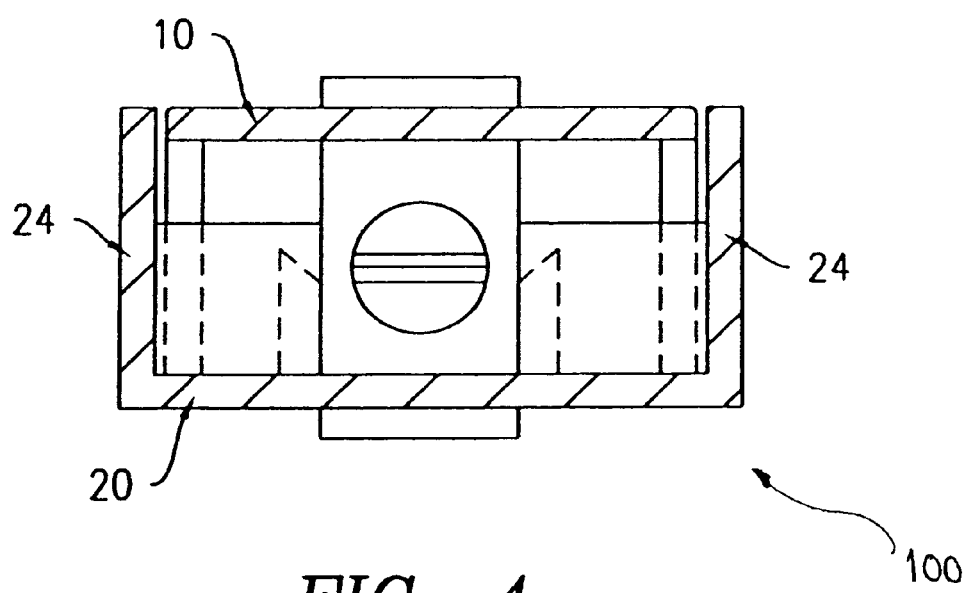
FIG. 4 shows a cross-sectional view of the attachment system according to the present invention along the line 4—4 of FIG. 3.

FIG. 2 further details the exemplary embodiment. An exemplary base section 4 has a top piece 10 and a bottom piece 20. As shown, top piece 10 and bottom piece 20 are interlocked in a closed position, forming the base section 4. The base section 4 has an attachment section mating area 30. As shown by FIG. 2, an exemplary attachment section mating area 30 comprises a tab 32 with a predefined opening 34 located on the top piece 10 of the base section 4. The base section 4 also has a cord connection area 40 where the cord 2 is coupled to the base section 4. Cord coupling may be achieved, for example, by a crimping caused by the interlocking of top piece 10 and bottom piece 20. Other possibilities for attaching the cord 2 to the base section 4 may also be used, as will be described below, and as will be apparent to those with skill in the art.

An exemplary attachment section 6 has an object holding area 70 and a base section mating area 50. As shown by FIGS. 2, 3, 5 and 6, an exemplary base section mating area 50 has a post 52 which secures the attachment section 6 to the base section 4 when the post 52 is snapped into the predefined opening 34 on the tab 32. An exemplary post 52 is a swivel post 60 with an enlarged cap 62 and narrower base 64. The narrower base 64 can have a cylindrical surface 66, which permits the attachment section 6 to rotate freely after being secured to the base section 4, thus allowing the object (such as an identification tag 3) being held and displayed to swivel as needed. Other possible configurations for posts 52 which are compatible with the tab 32 and predefined opening 34 may also be used, as will be described below, and as will be apparent to those skilled in the art.

An exemplary configuration of an object holding area 70, detailed in FIGS. 1, 2, 3 and 7, is a snap hook 80 (described below), although it will become apparent that other configurations for the object holding area 70 may be used in conjunction with base section 4. In FIG. 1, the snap hook 80 on the attachment section 6 is shown closed and engaged with an identification tag 3, such that the identification tag 3 is tightly secured to the attachment system 1.

The base section 4 and attachment section 6 may be implemented in various configurations. As will be appreciated by those with skill in the art, the particular structures used to form the attachment section mating areas 30 on example base sections 4 and the base section mating areas 50 on example attachment sections 6 may generally be used with any configurations of cord connection areas 40 on example base sections 4 and any configurations of object holding areas 70 on example attachment sections 6. The following examples thus provide illustration of some of the various implementations available.

Figure 5:
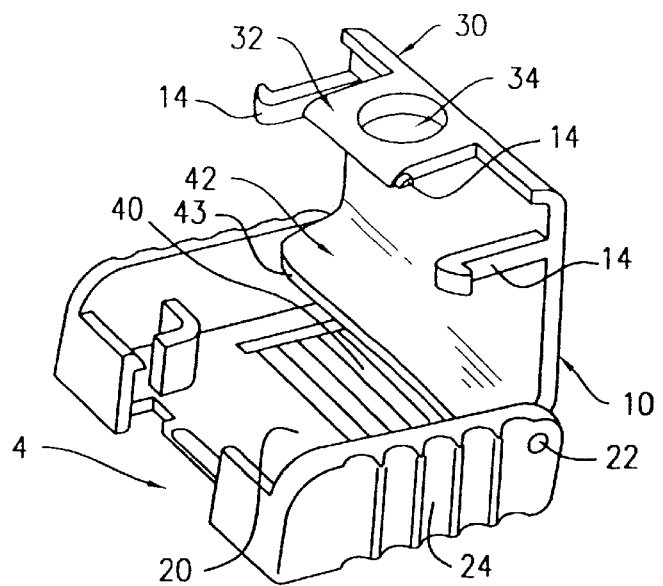
FIG. 5 shows a perspective view of a first exemplary base section in an open position, according to the present invention.
Figure 6:
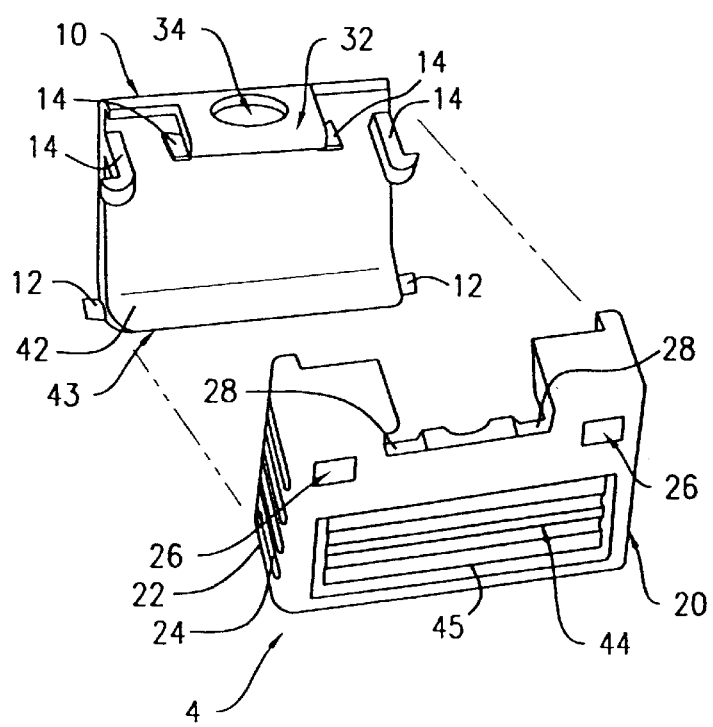
FIG. 6 shows a perspective view of each piece of the exemplary base section of FIG. 5 separated from one another.

For example, the base section 4 may be configured as detailed in FIGS. 5 and 6 (and shown in FIGS. 1–4), which includes a top piece 10 that is rotatably coupled to the bottom piece 20. To effect the rotational function, pins 12 extrude laterally from each side of crimping arm 42, and engage holes 22 formed in each side wall 24 of bottom piece 20. The base section 4 is formed when the top piece 10 is interlocked with the bottom piece 20. Interlocking is achieved via snap members 14 on the top piece 10 engaging interlock holes 26 and interlock tabs 28 on the bottom piece 20 when the two pieces are in a closed position (shown in FIGS. 1 and 2).

In an open position, detailed in FIG. 5, top piece 10 extends away from bottom piece 20. A cord 2 can easily be inserted into the cord connection area 40 when the top piece 10 is moved to be approximately perpendicular to the bottom piece 20 such that a crimping arm 42 on the top piece 10 extends parallel to the bottom piece 20. The cord 2 is coupled to the base section 4 and the cord connection area 40 is formed when the top piece 10 is moved into the closed position to be interlocked with the bottom piece 20, as explained more fully below.

Without a cord, when the top piece 10 is rotated into the closed position, an edge 43 of a crimping arm 42 on the top piece 10 engages an edge 45 of a flexible panel 44 on the bottom piece 20. Once a cord 2 is inserted into the cord connection area 40, the cord 2 is impinged between the edge 43 of the crimping arm 42 and the edge 45 of the flexible panel 44, as detailed in FIG. 3, thus creating a frictional connection between the base section 4 and the cord 2. The engagement of the cord 2, the edge 43 and the edge 45 allows the resistive force of the cord 2 to be realized as a downward force on the top piece 10 by virtue of the fulcrum effect of the pins 12. Also, any pulling force applied to the cord 2 will also be translated by the engagement of the cord 2 and edges 43 and 45 into downward force on top piece 10 by virtue of the fulcrum effect of pins 12.

As mentioned above and detailed in FIGS. 5 and 6, an exemplary attachment section mating area 30 on the base section 4 is formed from a tab 32 with a predefined opening 34 located on the top piece 10, and is constructed using an elastically deformable material such as molded plastic. As detailed in FIG. 7, an exemplary base section mating area 50 on the attachment section 6 is formed from a swivel post 60 with an enlarged cap 62 and a narrower base 64. The attachment section 6 is secured to the base section 4 by snapping the swivel post 60 into the predefined opening 34 with a force which temporarily causes the predefined opening 34 to elastically deform or stretch to accommodate the larger diameter 55 of the enlarged cap 62. After the enlarged cap 62 has been fully inserted into the base section 4, the predefined opening 34 returns to its original shape and size, thereby engaging the lower edge 63 of the enlarged cap 62 and securing the swivel post 60 within the tab 32. Once secured, the force required to pull the swivel post 60 out of the tab 32 is greater than the force required to snap the post 60 into the tab 32. Additionally, the narrower base 64 has a cylindrical outer surface 66, making the swivel post 60 freely rotatable once it has been secured within the tab 32, thus allowing the object being held and displayed to swivel as needed.

Figure 7:
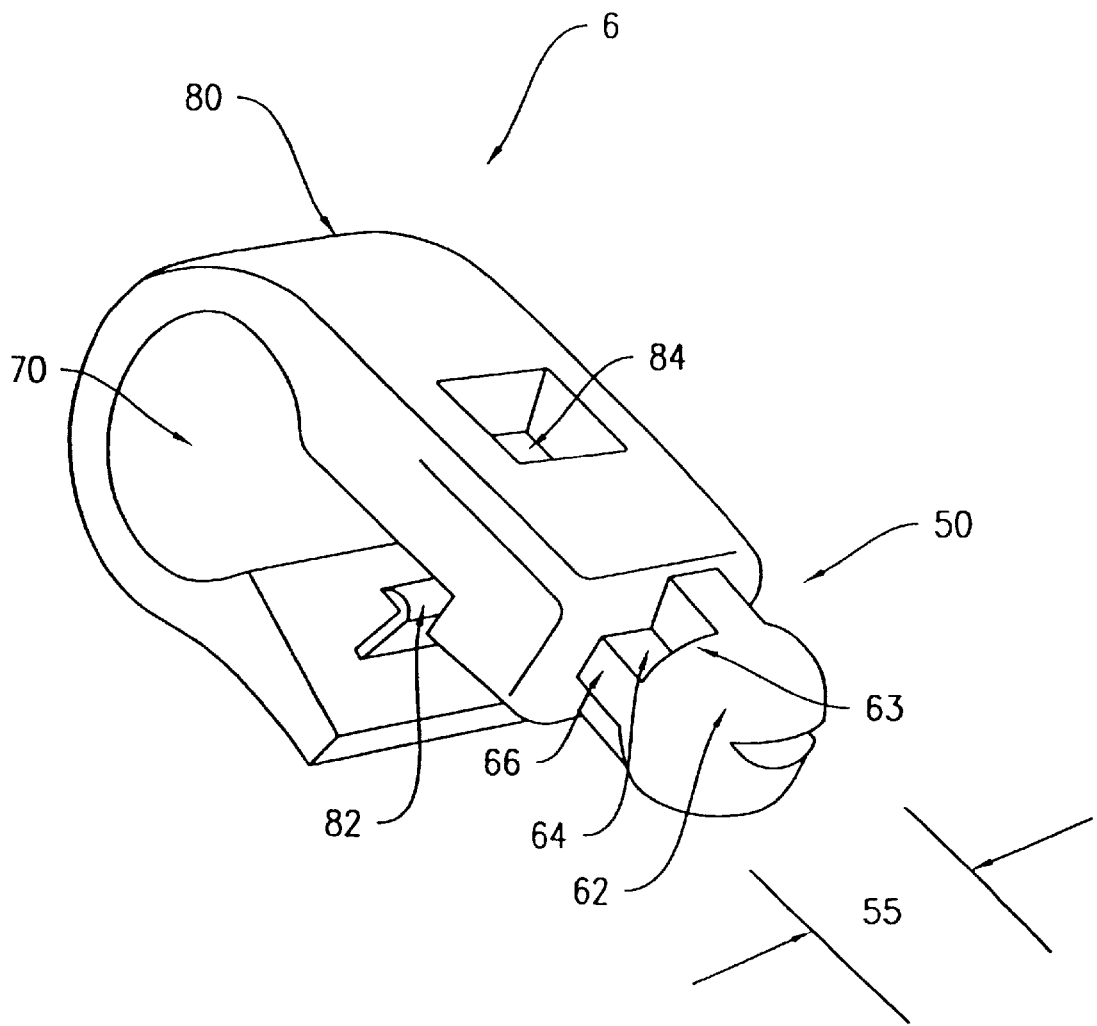
FIG. 7 shows a perspective view of an exemplary snap hook as an attachment section, according to the present invention.

An exemplary object holding area 70 (shown in FIGS. 1, 2, 3 and 7) on the attachment section 6 is formed from a snap hook 80, as detailed in FIG. 7. The snap hook 80, has a snap element 82 and an interlock hole 84. An object, such as an identification tag 3, can be placed on the snap hook 80 via a hole 5 on the tag 3, and secured to the snap hook 80 when the snap hook 80 is closed. The snap hook 80 is closed when the snap element 82 is snapped into the interlock hole 84, thereby engaging the interlock hole 84.

Figure 8:
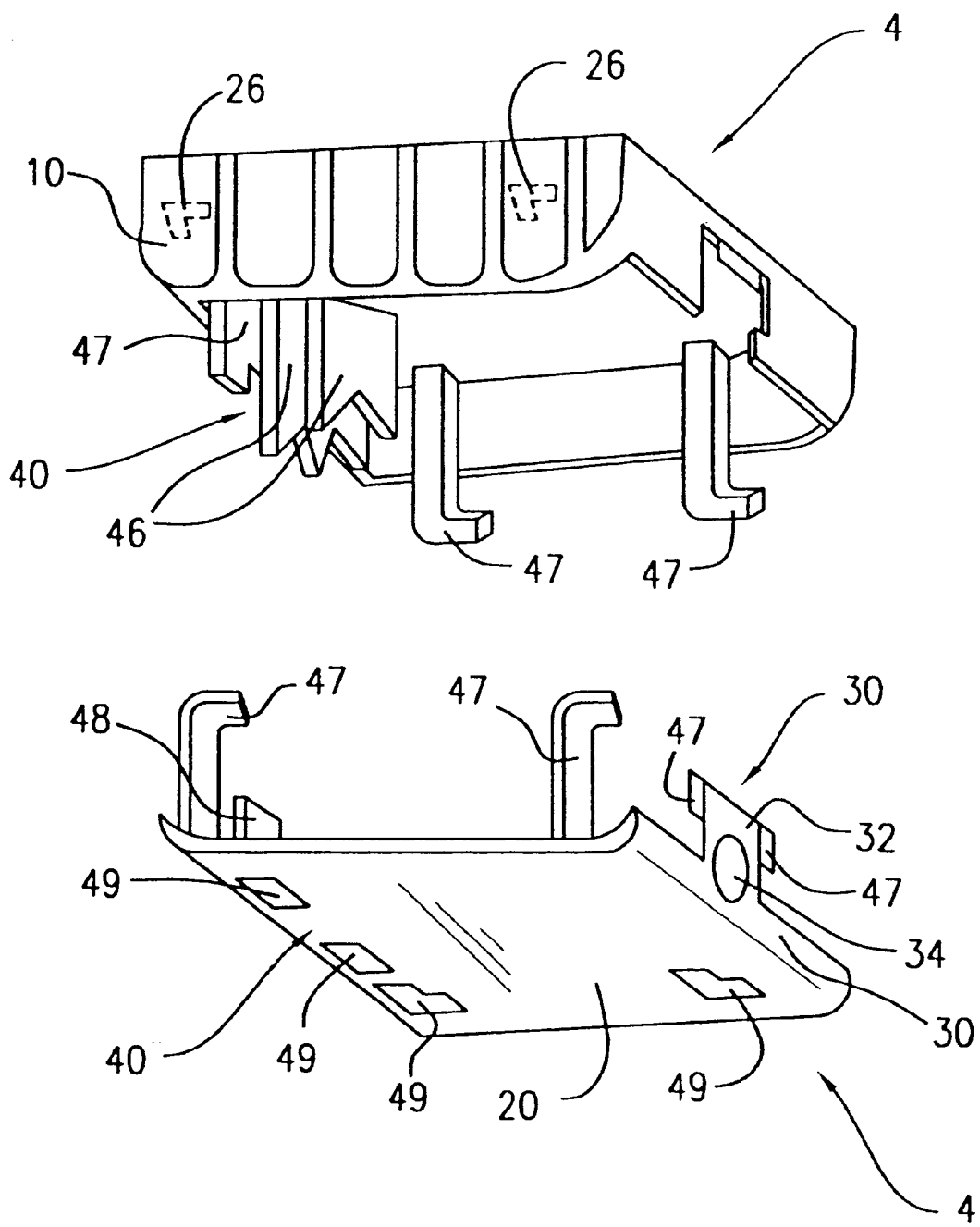
FIG. 8 shows a perspective view of a second exemplary base section according to the present invention.

There are many possible additional configurations for base sections 4 and attachment sections 6. A second configuration of the base section 4 is shown by FIG. 8, which shows the top piece 10 as separate from bottom piece 20 in the open position. Similar to the configuration shown by FIGS. 5 and 6, attachment section mating area 30 comprises, for example, a tab 32 with a predefined opening 34. The tab 32 in this second configuration is on the bottom piece 20. The cord connection area 40 is formed as two forked members 46 extending from top piece 10 toward bottom piece 20 and partially as an opposing member 48 extending from bottom piece 20 toward top piece 10. To achieve interlocking between top piece 10 and bottom piece 20, snap members 47 are provided on top piece 10 and bottom piece 20. These snap members 47 engage corresponding interlock holes 49 in top piece 10 and bottom piece 20.

When top piece 10 and bottom piece 20 are engaged to interlock in a closed position, the two forked members 46 and the opposing member 48 act to crimp, for example, a cord 2 interposed in the cord connection area 40, coupling the base section 4 to cord 2.

Figure 9:
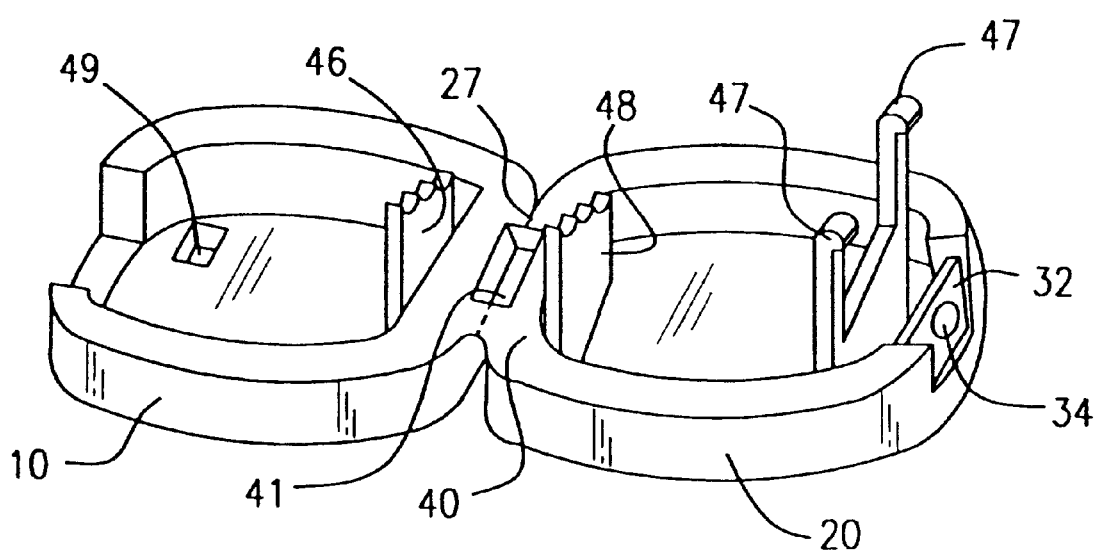
FIG. 9 shows a perspective view of a third exemplary base section according to the present invention.

A third configuration of the base section 4 is shown by FIG. 9, which shows the top piece 10 connected with bottom piece 20 via a hinge 27 formed, for example, from a thin layer of material common to both the top piece 10 and bottom piece 20. Similar to the configuration shown by FIGS. 5, 6 and 8 attachment section mating area 30 comprises, for example, a tab 32 with a predefined opening 34. The tab 32 in this third configuration is on the bottom piece 20. A cord 2 is secured to the base section 4 by being inserted into a cord insertion opening 41 in the cord connection area 40, and being engaged by a forked member 46 extending from top piece 10 toward bottom piece 20 and an opposing member 48 extending from bottom piece 20 toward top piece 10.

To achieve interlocking between top piece 10 and bottom piece 20, similar to the configuration shown by FIG. 8, snap members 47 are provided on bottom piece 20. These snap members 47 engage corresponding interlock holes 49 in top piece 10. When the top piece 10 and bottom piece 20 are engaged to interlock in a closed position, the forked member 46 and the opposing member 48 act to crimp, for example, a cord 2 interposed in the cord connection area 40, and thereby couple the base section 4 to cord 2.

Figure 10:
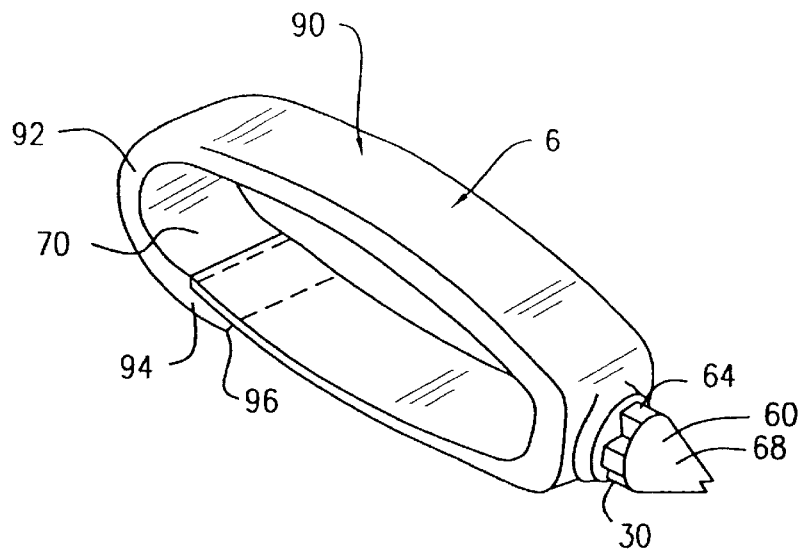
FIG. 10 shows a perspective view of an exemplary clip hook as an attachment section, according to the present invention.
Figure 11:
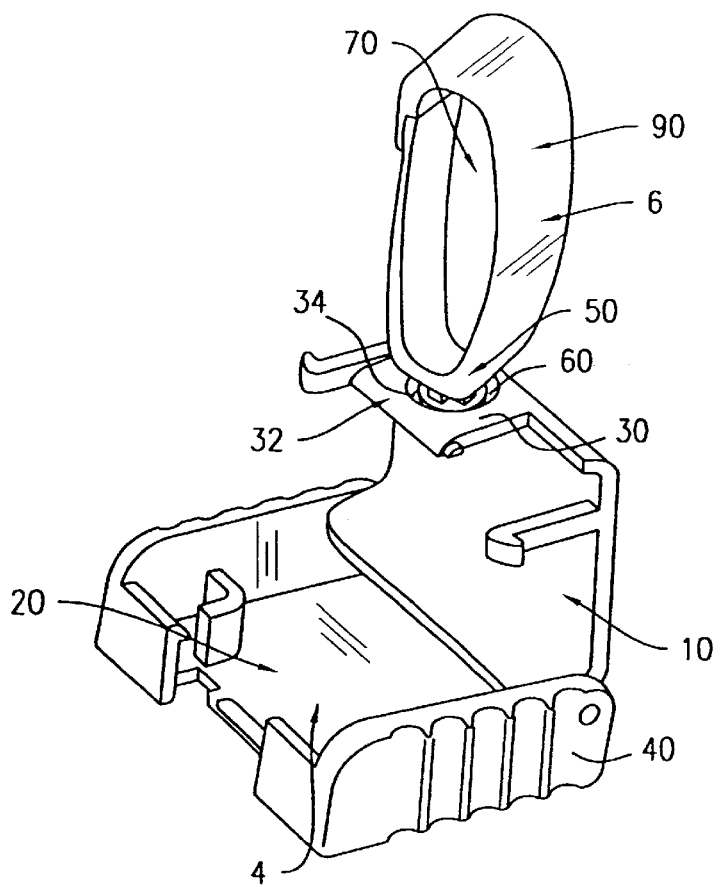
FIG. 11 shows a perspective view of an exemplary attachment system using a clip hook as the attachment section, according to the present invention.
Figure 12:
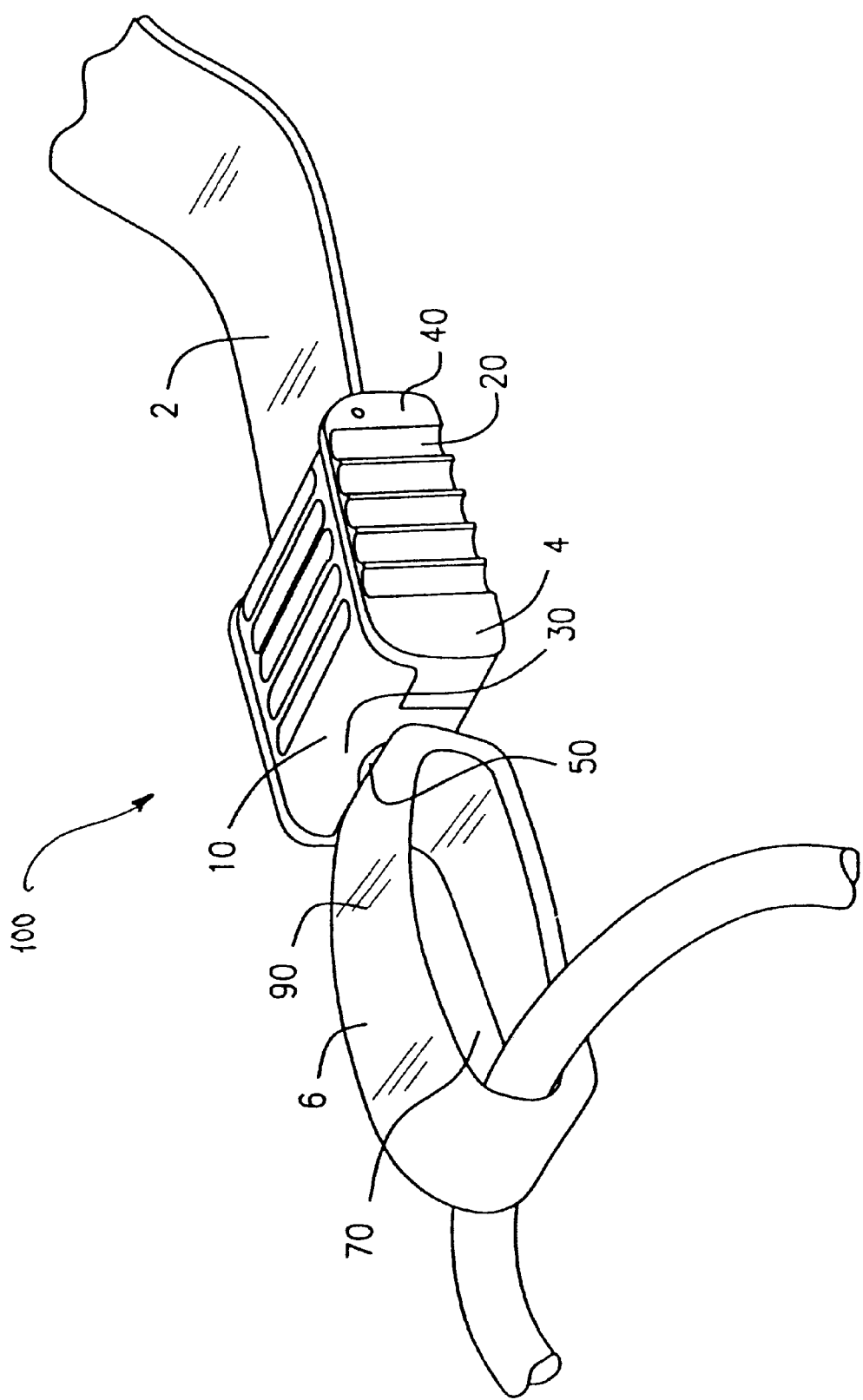
FIG. 12 shows a perspective view of an exemplary attachment system using a clip hook as the attachment section and engaged with a cord and an object, according to the present invention.

A second configuration for an attachment section 6 may also be implemented as shown in FIGS. 10–12, for example, by a clip hook 90 for the object holding area 70 and a swivel post 60 that has a conical enlarged cap 68 for the base section mating area 50. Clip hook 90 comprises a hook section 92, a base section mating area 50, and a clip section 94. The attachment section 6 is still rotatably coupled to the base section 4 by snapping the swivel post 60 with a conical enlarged cap 68 into the predefined opening 34 on the tab, thereby forming the attachment system 1.

Clip section 94 is implemented as a flexible member, extending from base section mating area 50 to contact hook section 92 at insertion point 96. Thus, to engage clip hook 90 with an object, for example, a key ring, identification badge or whistle, the object need only be forced through insertion point 96, causing clip section 94 to be deflected. Once the object has been fully inserted into hook section 92 such that it has cleared insertion point 96, clip section 94 returns to its original position contacting hook section 92, and thus securing the object within clip hook 90 (see FIG. 12).

Figure 13:
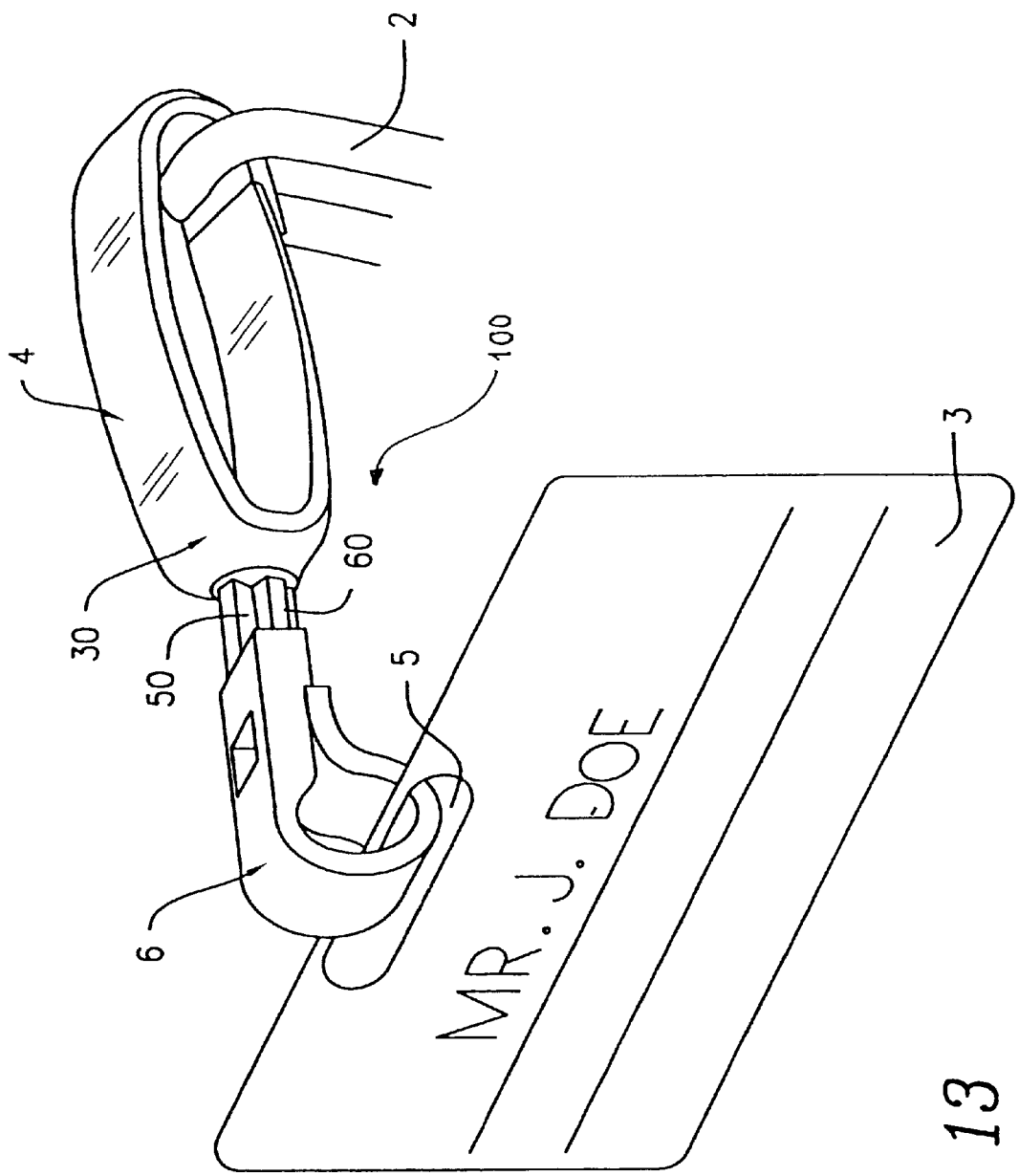
FIG. 13 shows a perspective view of an exemplary attachment system using a snap hook as the attachment section, a clip hook as the base section, and engaged with a cord and an object, according to the present invention.

An additional exemplary embodiment of the present invention is detailed in FIG. 13, showing a base section 4 being made of only one piece and having a cord connection area 40 with a configuration similar to a configuration of an object holding area 70 on an attachment section 6, such as a clip hook 90. The base section 4 would have an attachment section mating area 30 comprising a predefined opening 34 and being made of an elastically deformable material, and an attachment section 6 would still be secured to the base section 4 by snapping a swivel post 60 in the base section mating area 50 of the attachment section 6 into the predefined opening 34. The cord connection area 40 would be formed from the clip hook 90. A cord 2 would be secured to the base section 4 by pushing the cord 2 through insertion point 96, causing clip section 94 to be deflected. Once the cord 2 has been fully inserted into clip hook 90 such that it has cleared insertion point 96, clip section 94 returns to its original position contacting hook section 92, and thus securing the cord 2 within clip hook 90.

An advantage of this configuration is that, as mentioned above, it provides a more simplified mode of manufacture and assembly. Attachment systems could be manufactured by fabricating clip hooks 90, snap hooks 80 or gripper elements (not shown), giving some of them base section mating areas 50, such as swivel posts 60 (making them attachment sections), and giving the remainder attachment section mating areas 30, such as predefined openings 34 (making them base sections). The assembly would only require snapping an attachment section 6 into a base section 4, and then securing the cord 2 and object to each section. This configuration also presents an even greater flexibility for the consumer, since the consumer can interchangeably use different hooks or gripper elements for each section in the attachment system depending on their specific needs for the type of object to be held and displayed and the type of cord 2 to be used to secure the object to a holder or person.

In the preceding specification, the invention has been described with reference to specific exemplary embodiments thereof. It will, however, be evident that various modifications and changes may be made thereunto without departing from the broader spirit and scope of the invention as set forth in the claims that follow. The specification and drawings are accordingly to be regarded in an illustrative rather than restrictive sense.

What is claimed is:

1. A standardized attachment system, comprising:
    a base section including a top piece and a bottom piece, the base section having a cord connection area and an attachment section mating area, the attachment section mating area comprising an opening on a surface on the top piece or the bottom piece of the base section through a periphery of the base section, the opening having a closed perimeter enclosed within the surface on the top piece or the bottom piece; and
    an attachment section having an object holding area and a base section mating area, the base section mating area comprising a one-piece post;
    wherein the base section is coupled to the attachment section by snapping the post into the opening, and wherein the base section is connected via the cord connection area to a cord, and the attachment section is connected via the object holding area to an object.

2. The standardized attachment system of claim 1, wherein at least one of the base section and attachment section is constructed of molded plastic.

3. The standardized attachment system of claim 1, wherein the surface on one of the top piece and the bottom piece of the base section is a tab.

4. The standardized attachment system of claim 3, wherein the post has a bottom portion and a top portion, the bottom portion having a diameter smaller than a first diameter of the opening, and the top portion having a diameter larger than the first diameter of the opening.

5. The standardized attachment system of claim 4, wherein the post is a swivel post.

6. The standardized attachment system of claim 5, wherein the swivel post has an enlarged cap.

7. The standardized attachment system of claim 6, wherein the base section is rotatably coupled to the attachment section.

8. The standardized attachment system of claim 3, wherein the tab is positioned on a portion of the top piece.

9. The standardized attachment system of claim 8, wherein the base section is formed when the top piece and the bottom piece are interlocked in a closed position, the opening exposing an interior of the base section to an exterior of the base section.

10. The standardized attachment system of claim 9, wherein the top piece is separate from the bottom piece, the base section formed by mating the top piece to interlock with the bottom piece in the closed position.

11. The standardized attachment system of claim 9, wherein the top piece is connected to the bottom piece via a hinge area, and wherein the base section is formed by folding the top piece to interlock with the bottom piece in the closed position.

12. The standardized attachment system of claim 9, wherein the top piece is rotatably connected to the bottom piece via at least one protruding pin and receiving hole, the base section formed by rotating the top piece to interlock with the bottom piece in the closed position.

13. The standardized attachment system of claim 12, wherein the post is a swivel post with an enlarged cap.

14. The standardized attachment system of claim 13, wherein the base section is rotatably coupled to the attachment section.

15. The standardized attachment system of claim 14, wherein at least one of the base section and the attachment section is constructed of molded plastic.

16. The standardized attachment system of claim 1, wherein a portion of the cord is crimped between a portion of the top piece and bottom piece in the cord connection area when the top piece is interlocked with the bottom piece.

17. A standardized attachment system, comprising:
    a base section having a cord connection area and an attachment section mating area, the attachment section mating area comprising an opening through a tab on the base section, wherein the tab is constructed of an elastically deformable material;
    an attachment section having an object holding area and a base section mating area, the base section mating area comprising a post, wherein the post has a bottom portion and a top portion, the bottom portion having a diameter smaller than a first diameter of the opening, and the top portion having a diameter larger than the first diameter of the opening;
    wherein the base section is coupled to the attachment section by snapping the post into the opening, and wherein the base section is connected via the cord connection area to a cord, and the attachment section is connected via the object holding area to an object.

18. The standardized attachment system of claim 17, wherein the elastically deformable material is molded plastic.

19. The standardized attachment system of claim 17, wherein the post is snapped into the tab by pushing the top portion through the opening with a force which temporarily causes a perimeter of the opening to elastically deform to increase a diameter of the opening from the first diameter to accommodate the larger diameter of the top portion, the push securing the post to the tab after the top portion has been inserted into the base section by engaging a lower edge of the top portion with the tab when the perimeter returns to an original shape and the diameter of the opening returns to the first diameter.

20. The standardized attachment system of claim 19, wherein the top portion of the post has a conical shape.

21. The standardized attachment system of claim 19, wherein the top portion of the swivel post has a spherical shape.

22. The standardized attachment system of claim 21, wherein the perimeter of the opening has a circular shape.

23. The standardized attachment system of claim 22, wherein the bottom portion of the swivel post has a cylindrical outer surface.

24. The standardized attachment system of claim 23, wherein, a gap between an inner surface of the perimeter and an outer surface of the bottom portion results from a difference in the first diameter of the opening and the diameter of the bottom portion, the gap permitting the attachment section to rotate freely about a longitudinal axis of the system when the base section and attachment section are coupled to one another.

25. The standardized attachment system of claim 17, wherein the object holding area comprises a snap hook.

26. The standardized attachment system of claim 17, wherein the object holding area comprises a clip hook.

27. A standardized attachment system, comprising:
a base section having a cord connection area and an attachment section mating area, the attachment section mating area comprising an opening on a surface of the base section through a periphery of the base section, wherein the cord connection area comprises a snap hook; and
an attachment section having an object holding area and a base section mating area, the base section mating area comprising a post;
wherein the base section is coupled to the attachment section by snapping the post into the opening, and wherein the base section is connected via the snap hook to a cord, and the attachment section is connected via the object holding area to an object.

28. A standardized attachment system, comprising:
a base section having a cord connection area and an attachment section mating area, the attachment section mating area comprising an opening on a surface of the base section through a periphery of the base section, wherein the cord connection area comprises a clip hook; and
an attachment section having an object holding area and a base section mating area, the base section mating area comprising a post;
wherein the base section is coupled to the attachment section by snapping the post into the opening, and wherein the base section is connected via the clip hook to a cord, and the attachment section is connected via the object holding area to an object.

29. A standardized attachment system, comprising:
a base section including a top piece and a bottom piece, the base section having a cord connection area and an attachment section mating area, the attachment section mating area comprising an opening through a tab positioned on a portion of the bottom piece; and
an attachment section having an object holding area and a base section mating area, the base section mating area comprising a post;
wherein the base section is coupled to the attachment section by snapping the post into the opening, and wherein the base section is connected via the cord connection area to a cord, and the attachment section is connected via the object holding area to an object.

30. An object holding and display system comprising:
a cord; and
a standardized attachment system coupled to the cord comprising:
a base section having a cord connection area and an attachment section mating area, the base section comprising a top piece and a bottom piece, the attachment section mating area comprising a tab on a surface of the top piece, the tab having an opening extending from an interior of the base section to an exterior of the base section, the opening having a closed perimeter enclosed within the tab; and
an attachment section having an object holding area and a base section mating area, the base section mating area comprising a one-piece post;
wherein the base section is coupled to the attachment section by snapping the post into the opening, and wherein the base section is connected via the cord connection area to a cord, and the attachment section is connected via the object holding area to an object.

31. The object holding and display system of claim 30, wherein the attachment section is constructed of molded plastic.

32. An object holding and display system comprising:
a cord; and
a standardized attachment system coupled to the cord comprising:
a base section having a cord connection area and an attachment section mating area, the base section comprising a top piece and a bottom piece, the attachment section mating area comprising a tab on a surface of the top piece, the tab having an opening extending from an interior of the base section to an exterior of the base section; and
an attachment section having an object holding area and a base section mating area, the base section mating area comprising a one-piece post, the object holding area including a snap hook;
wherein the base section is coupled to the attachment section by snapping the post into the tab, and wherein the base section is connected via the cord connection area to a cord, and the attachment section is connected via the object holding area to an object.

33. An object holding and display system comprising:
a cord; and
a standardized attachment system coupled to the cord comprising:
a base section having a cord connection area and an attachment section mating area, the base section comprising a top piece and a bottom piece, the attachment section mating area comprising a tab on a surface of the top piece, the tab having an opening extending from an interior of the base section to an exterior of the base section; and
an attachment section having an object holding area and a base section mating area, the base section mating area comprising a one-piece post, the object holding area including a clip hook;
wherein the base section is coupled to the attachment section by snapping the post into the tab, and wherein the base section is connected via the cord connection area to a cord, and the attachment section is connected via the object holding area to an object.

34. An object holding and display system, comprising:
a cord; and
a standardized attachment system coupled to the cord comprising:
a base section having a cord connection area and an attachment section mating area, the base section comprising a top piece and a bottom piece, the attachment section mating area comprising a tab on a surface of the top piece, the tab having an opening extending from an interior of the base section to an exterior of the base section, wherein the base section is constructed of an elastically deformable material; and
an attachment section having an object holding area and a base section mating area, the base section mating area comprising a post;
wherein the base section is coupled to the attachment section by snapping the post into the tab, and wherein the base section is connected via the cord connection area to a cord, and the attachment section is connected via the object holding area to an object.

35. The object holding and display system of claim 34, wherein the elastically deformable material is molded plastic.

36. A standardized attachment system, comprising:

a base section including a top piece and a bottom piece, the base section having a cord connection area and an attachment section mating area, the attachment section mating area comprising an opening on a surface on the top piece or the bottom piece of the base section through a periphery of the base section, the opening on the surface having a closed perimeter enclosed within the surface; and an attachment section having an object holding area and a base section mating area, the base section mating area comprising a one-piece post;

wherein the attachment section is connected via the object holding area to an object, wherein the base section is coupled to the attachment section by snapping the post into the opening, and wherein the base section is connected to a cord by crimping a portion of the cord between a portion of the top piece and bottom piece in the cord connection area when the top piece is interlocked with the bottom piece of the base section.

* * * * *